United States Patent [19]

Petersson

[11] Patent Number: 5,142,289
[45] Date of Patent: Aug. 25, 1992

[54] METHOD FOR IMPROVING THE AMPLITUDE-FREQUENCY CHARACTERISTIC OF A RADAR SYSTEM

[75] Inventor: Robert N. O. Petersson, Mölndal, Sweden

[73] Assignee: Telefonakitebolaget L M Ericsson, Stockholm, Sweden

[21] Appl. No.: 697,406

[22] Filed: May 9, 1991

[30] Foreign Application Priority Data

Jun. 8, 1990 [SE] Sweden ............................ 9002064

[51] Int. Cl.$^5$ ............................................ G01S 13/44
[52] U.S. Cl. .................................... 342/158; 342/25; 342/74; 342/79; 342/81
[58] Field of Search ................. 342/158, 81, 179, 190, 342/202, 25, 74, 75, 78, 79

[56] References Cited

U.S. PATENT DOCUMENTS

| | | | |
|---|---|---|---|
| 3,266,038 | 8/1966 | Milne et al. | 342/154 |
| 4,253,098 | 2/1981 | Blythe | 342/25 |
| 4,291,310 | 9/1981 | Kruger | 342/16 |
| 4,450,444 | 5/1984 | Wehner et al. | 342/25 |
| 4,509,048 | 4/1985 | Jain | 342/25 |
| 4,538,149 | 8/1985 | Wehner | 342/194 |
| 4,547,775 | 10/1985 | Wehner et al. | 342/201 |
| 4,564,839 | 1/1986 | Powell | 342/25 |
| 4,586,044 | 4/1986 | Hopwood et al. | 342/202 |
| 4,665,400 | 5/1987 | Törby | 342/27 |
| 4,706,088 | 11/1987 | Weindling | 342/25 |
| 4,706,089 | 11/1987 | Weindling | 342/25 |
| 4,866,446 | 9/1989 | Hellsten | 342/25 |
| 4,965,582 | 10/1990 | Hellsten | 342/25 |
| 4,989,008 | 1/1991 | Fujisaka et al. | 342/25 |
| 4,996,532 | 2/1991 | Kirimoto et al. | 342/81 |
| 5,059,966 | 10/1991 | Fujisaka et al. | 342/25 |
| 5,087,917 | 2/1992 | Fujisaka et al. | 342/84 |

FOREIGN PATENT DOCUMENTS

333397 3/1971 Sweden.

Primary Examiner—John B. Sotomayor
Attorney, Agent, or Firm—Burns, Doane, Swecker & Mathis

[57] ABSTRACT

A method of improving the amplitude-frequency characteristic when receiving a target echo (M) in a radar system installed on a satellite or an aircraft and carried at a given height (h) above the earth's surface. The method utilizes the known method of compressing a received pulse which contains a number of frequencies ($f_1$–$f_2$) in order to obtain improved dissolution of the target. According to the method, the receiving lobe of the radar is swept, independently of frequency, over a given larger angular area ($\theta_b$ $_{l-\theta a}$) within which the target (M) is located. Within the smaller angular area ($\Delta\theta$) occupied by the target as seen from the radar, i.e. the momentary width ($\Delta w$) of the target echo, however, the receiving lobe is controlled in dependence on the frequencies ($f_1$–$f_2$) so as to obtain a number of optimally located receiving lobes for the smaller angular area ($\Delta\theta$).

3 Claims, 3 Drawing Sheets

METHOD FOR IMPROVING THE AMPLITUDE-FREQUENCY CHARACTERISTIC OF A RADAR SYSTEM

TECHNICAL FIELD

The present invention relates to a method for increasing the effective lobe width of a radar system which includes a swept receiving lobe and pulse compression. The inventive method is primarily intended for detecting targets on the earth's surface and is utilized in spaceborne or airborne-carried systems.

BACKGROUND ART

The technique of using pulse compression when receiving echos from targets is earlier known; see for instance C. Elachi "SPACEBORNE RADAR REMOTE SENSING: APPLICATIONS AND TECHNIQUES", pages 57–58. The radar system transmits a pulse signal of given pulse time-length, for instance a pulse duration of 50 μs. The actual signal is frequency swept, i.e. the beginning of the signal has a first given frequency $f_1$ and the end of the signal has another signal $f_2$. The frequency band $B = f_1 - f_2$ may, for instance, be 50 MHz. The radar is side-looking, whereby echos from various locations on the ground are reflected and arrive back at mutually different points in time.

The radar receiving lobe, i.e., the radiation pattern used when the radar is in the receiving mode, is intended to track the ground echo between two points on the earth's surface. The echo reflected from a target point on the earth's surface gives rise to a received signal in the radar, where the receiving lobe is swept over the target. The received frequency $f_1$ will therewith arrive slightly before the frequency $f_2$ and in the order that the frequencies $f_1$ and $f_2$ were transmitted from the radar system.

Pulse compression of the received frequency components of the pulse is effected in the receiver with the intention of obtaining a stronger echo and in order to obtain improved distance resolution of the target. FIG. 1 illustrates the principle of pulse compression. The received signal pulse, FIG. 1a, includes the frequencies $f_1$, $f_2$, $f_3$ and is applied to a matched delay line which delays the frequencies to mutually different extents, so that the frequencies $f_2$ and $f_1$ will "catch up" with the frequency $f_3$ and so that finally, FIG. 1d, all components will form a compressed pulse.

FIG. 2 illustrates the radar receiving lobe and the propagation of the transmitted pulse (broken line) at a given moment in time on the earth's surface when receiving in accordance with the known technique. When the lobe contacts a target point, the first frequency $f_1$ is reflected and the echo is caught by the receiving lobe at point 1. The centre frequency $(f_1 - f_2)/2$ is reflected by the same target point somewhat later. Since the receiving lobe is swept and "tracks" the echo, the centre frequency will be captured by the receiving lobe at point 3. The same applies to the frequency $f_2$, which is reflected last and which is captured by the receiving lobe at point 2. The width of the lobe is roughly equal to the propagation of the pulse.

FIG. 3 illustrates the amplitude of the received signal as a function of frequency. The amplitude is weighted, depending on the configuration of the receiving lobe. When the "outer" frequencies $f_1$ and $f_2$ are detected within the receiving lobe (points 1 and 2), said frequencies will be weaker than the centre frequency $(f_1 - f_2)/2$ (point 3).

Thus, the problem is that when using a narrow receiving lobe whose width is of the same order of magnitude as the "momentary angular width" of the echo, the amplitude-frequency characteristic of the echo is subjected to pronounced quadratic amplitude weighting. When the pulse is later compressed, the propagation obtained results in poorer resolution in respect of time/distance. There is also obtained a large amplification derivative at the beginning and the end of the pulse, which renders the system highly sensitive to small antenna lobe pointing errors.

DISCLOSURE OF THE INVENTION

The proposed method combines two different but known procedures in a radar antenna where a receiving lobe is swept over a target within a given area and which includes pulse compression of the received signal in the aforedescribed manner. The one procedure includes sweeping the receiving lobe over the larger angular area independently of frequency, and the other procedure includes frequency-dependent sweeping of the lobe over the smaller angular area within the larger area taken up by the momentary width of the echo as seen from the radar-carried equipment, for instance a satellite or an aircraft. Sweeping of the antenna in accordance with these procedures is therewith effected in one and the same direction or in one and the same plane. This combination of known procedures is able to eliminate almost completely the aforedescribed amplitude weighting and sensitivity to indication errors, which is the object of the present invention.

The inventive method is characterized in that steering of the receiving lobe over a given angular area is frequency-independent with the exception of a smaller angular area within the given angular area where guiding of the lobes is dependent on the frequencies within the band of frequencies transmitted by a transmitter pulse, and, in the case of the smaller angular area, there is formed a number of receiving lobes which correspond to the number of frequencies and each of the lobes has an optimum position in relation to a swept target occupying the smaller angular area.

BRIEF DESCRIPTION OF THE DRAWINGS

The invention will now be described in more detail with reference to the accompanying drawings, in which FIGS. 1–3 have been previously described under the heading "Background Art".

BEST MODE OF CARRYING OUT THE INVENTION

Figure 4:
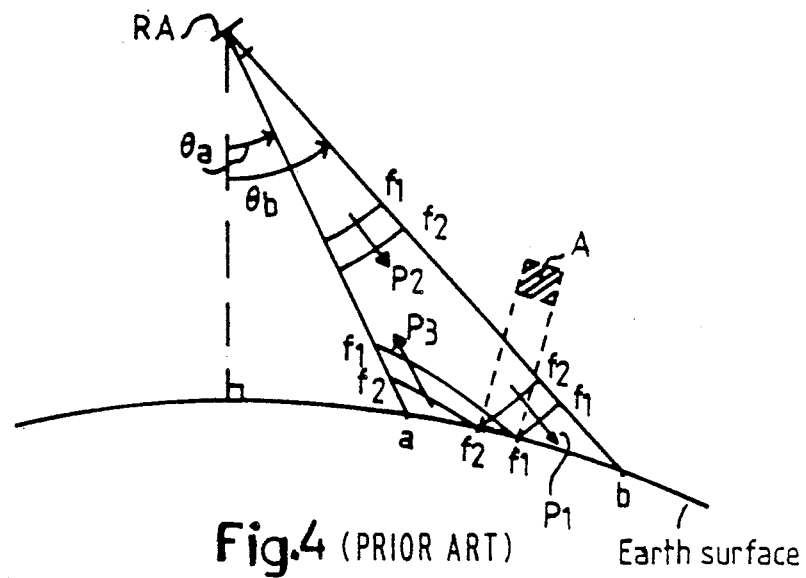
FIG. 4 illustrates the geometry obtained when transmitting a radar pulse which is swept over a given frequency range.

FIG. 4 illustrates the geometry of a radar system installed, for instance, in a satellite which illuminates part of the earth's surface. The radar antenna RA transmits a pulse which contains frequencies within a given band in accordance with the aforegoing. The frequencies $f_1$ and $f_2$ constitute the initial and final frequency of a pulse respectively. The arrows P1 and P2 indicate two sequential pulses, of which the pulse referenced P1 has contacted the earth's surface. The front part of the pulse P1 (frequency $f_1$) has first contacted the earth's surface at point a and the rear part (frequency $f_2$) of the pulse strikes the same point a shortly thereafter ($\approx =50\ \mu s$). The pulse P1 then sweeps over the earth's surface to the point b, where the front part of the pulse ceases and a short time thereafter ($\approx =50\ \mu s$), the rear part ($f_2$) of the pulse also ceases. FIG. 4 illustrates a given (frozen) moment when the pulse illuminates an area schematically referenced A in the Figure. The target M may either be a punctiform target or an extended target and is assumed to be located within the area A, for example. Illumination of the area between a and b gives rise to an echo which propagates according to the arrow P3. Thus, when the pulse is received, the receiving lobe will thus track the propagation of the pulse from point a to point b and, among other things, give rise to the target echo to be detected by the antenna RA. Tracking of the echo thus takes place in a conventional manner, i.e. with a receiving lobe which is controlled with the aid of a phase shifter, for example.

Figure 1:
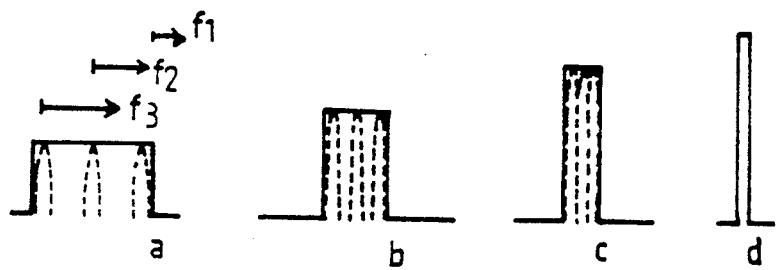
Figure 2:
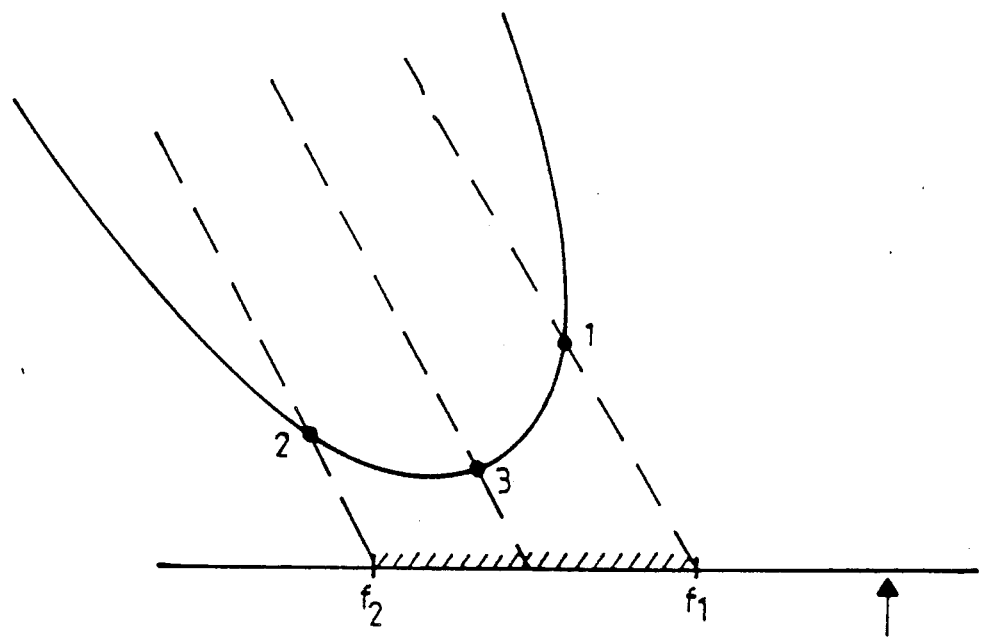
Figure 5:
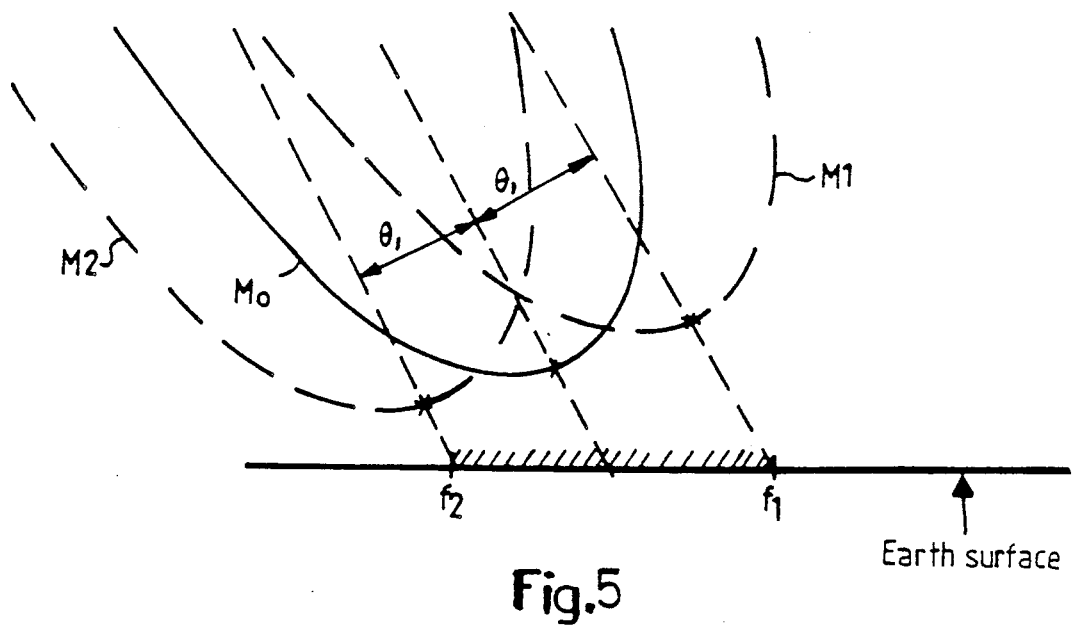
FIG. 5 illustrates in more detail receiving lobes located in the geometry illustrated in FIG. 4, but guided in accordance with the proposed method.

In accordance with the invention, the pointing direction of the antenna lobe when receiving is also made dependent on the frequency of the transmitted pulse. In this way, it is possible to direct the peak or apex of the antenna lobe towards the point on the ground where a corresponding frequency was reflected while, at the same time, tracking the echo in a conventional manner. FIG. 5 illustrates three different antenna lobes M0, M1, M2 for three different frequencies of the transmitted pulse. The two outer lobes M1, M2 shown in broken lines correspond respectively to the frequency $f_1$ and $f_2$, while the full-line lobe M0 corresponds, for instance, to the centre frequency $f_0 = f_2 + (f_1 - f_2)/2$. The rereflected frequency components come closer to the peak of respective lobes than in the known case illustrated in FIG. 2 and therefore give rise to a constant detected signal over the frequency band $f_1 - f_2$. When detecting in the radar receiver, there is used pulse compressions in the aforedescribed manner and the compressed signal will also be stronger than in the known case illustrated in FIG. 2. This enables the good resolution of the radar to be maintained despite the sweep. The frequency-dependency of the receiving lobe is thus adapted to the momentary propagation of the echo and the band width of the transmitted pulse.

Figure 6:
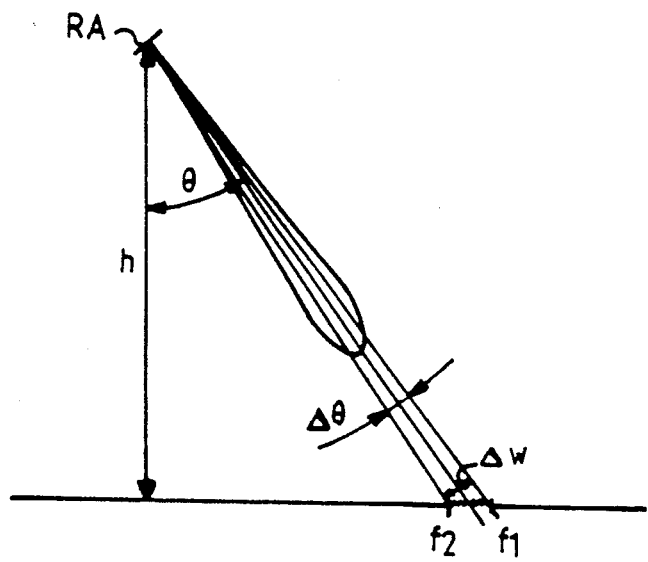
FIG. 6 illustrates schematically the radar geometry obtained when detecting targets on the earth's surface.

In order to compensate for amplitude weighting in the desired manner, it is necessary to select the frequency sensitivity of the antenna in an appropriate manner. The primary parameters which influence this choice are:

The radar geometry (see FIG. 6);
The length of the radar pulse;
The band width of the radar pulse.

The following signs are introduced for the purpose of obtaining an expression of frequency sensitivity $d\theta/df$:

h = The height of the radar above the ground
$\theta$ = The angle from the vertical to the object (seen from the radar)
$t_p$ = The duration of the radar pulse (time)
B = Band width of the radar pulse
$\Delta\theta$ = The momentary-width of the radar echo as seen from the radar (angular width)
$\Delta w$ = The momentary-width of the radar echo
$d\theta/df$ = The requisite sensitivity of the antenna to frequency
$c_0$ = Speed of light $$\Delta w = \frac{C_o \times t_p}{2} \cot(\theta)$$

$$\Delta\theta = a\sin \frac{\Delta w \cos(\theta)}{h}$$

$$= a\sin \frac{C_o \times t_p \times \cos^2(\theta)}{2h \sin(\theta)}$$

The requisite sensitivity of the antenna to frequency is thus $$\frac{d\theta}{df} = \frac{\Delta\theta}{B}$$

In normal cases where $C_o \cdot t_p << 2 \cdot h$ and $10° < \theta < 40°$ can be expressed more simply as:

$$\frac{d\theta}{df} \approx \frac{C_o \times t_p \cos^2(\theta)}{B \times 2h \times \sin(\theta)} \quad [\text{radians/Hz}]$$

In normal application, the lobe is steered over a relatively large angular area $\theta_b - \theta_a$; see FIG. 4. Thus, when the momentary width w of the radar echo varies with $\theta$, the frequency-sensitivity of the antenna will not be optimal over the whole of the angular area. In a typical case, $\Delta w$ can vary by about 1:3. In the worst case, the amplitude weighting is reduced by a factor of ten and the amplification derivative is reduced by a factor of 3 (lobe width = 2.9°, the momentary width of the echo is 0.4°-1.3°).

It is also possible to obtain a variable frequency-sensitivity, in other words $\theta$, by appropriate selection of, for instance, the normal direction $\theta_o$ of the antenna in relation to the lobe direction. i.e. $90° > \theta_o > 0°$. It is then possible to obtain optimal compensation over the major part of the angular area $\theta_b - \theta_a$.

Figure 7:
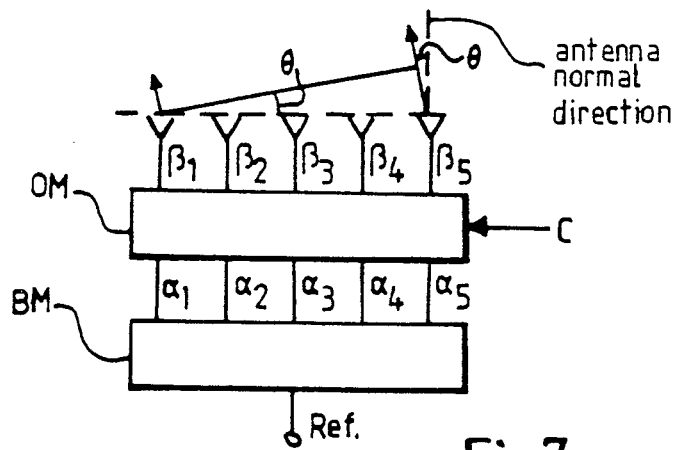
FIG. 7 is a simplified block schematic of an antenna when receiving in accordance with the method.

FIG. 7 is a simplified block schematic of an antenna for obtaining the desired feed lobes illustrated in FIG. 6. The antenna consists essentially of three parts, namely a number of radiation elements, a frequency-independent supply network OM and a frequency-dependent supply network BM. The direction of the receiving lobe relative to the normal direction of the antenna is $\theta$. The phase positions of the individual radiation elements are referenced $\beta_1, \beta_2, \ldots$ and corresponding phase positions of the received signal are referenced $\alpha_1, \alpha_2, \ldots$.

The frequency-dependent network BM delivers on its output the received signal which is to be pulse-compressed in the radar receiver in a known manner. The phase positions $\alpha_1 - \alpha_5$ of a received signal are dependent on the received frequency f, so that $$(\alpha_1 - \alpha_2) \approx (\alpha_2 - \alpha_3) \approx (\alpha_3 - \alpha_4) \approx (\alpha_4 - \alpha_5) \approx k \cdot \Delta f$$

Since the frequency f of the transmitted pulse varies about a centre frequency $f_o$, k shall be selected so as to obtain a correct angular-dependency of the receiving lobe with respect to the frequency. The coefficient k can be written as:

$$k = \frac{d\theta}{df} \times \frac{d\alpha}{d\theta}$$

In the case of lobe angles $\theta$ close to the normal of the antenna surface, k can be written as $$k = \frac{d\theta}{df} \times 2\pi \, d/\lambda_o$$

where $d\theta/df$ is given according to the above and $\lambda_o$ = the free wavelength of the radiated field.

The frequency-independent network OM is constructed so that $(\beta_1-\alpha_1)$, $(\beta_2-\alpha_2)$, etc. are independent of the frequency f and are determined through control data C delivered to the network OM. These control data thus determine the position or direction of the lobe between the angles $\theta_b$ and $\theta_a$ according to FIG. 5. The directional sense of the lobe is controlled in a manner such that the echo is tracked from point a to point b according to FIG. 5.

Figure 8:
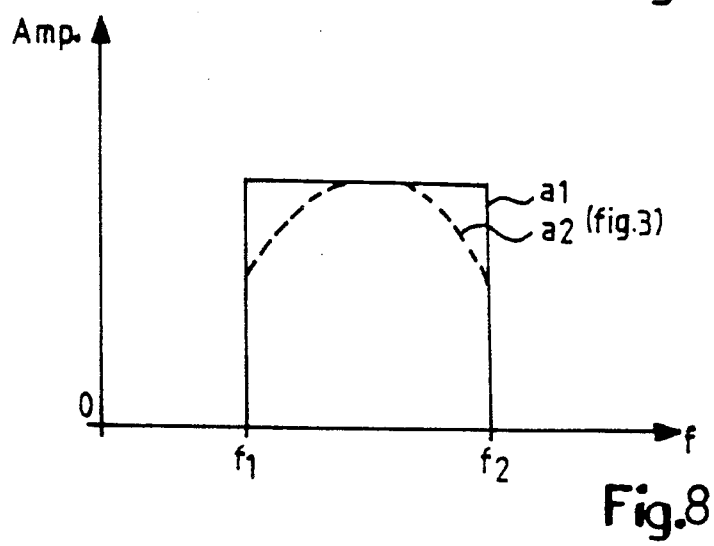
FIG. 8 is a diagramme which shows the amplitude of received signals as a function of the frequency.

The frequency-dependent network BM can be realized in the same manner as a frequency-controlled antenna shown, for instance, in "Introduction to Radar Systems", chapter 8.4, page 298, FIGS. 8.14 by Merril I. Skolnik. Such an antenna consists of a number of radiation elements and a number of conductor pieces connected to the radiation elements, where each conductor piece has a length = l and where said pieces have a mutual spacing = d. In the frequency-dependent network BM, the conductor pieces are connected to the frequency-independent network OM instead of being connected to the radiation elements.

A frequency-controlled antenna having air-filled dispersion-free conduction has the lobe direction $\theta_1$.

$$\sin \theta_1 = l/d(1-f_o/f)$$

wherein $\theta_1 = \theta_o + \Delta\theta$ and wherein when $\theta_o \approx 0$, the following equation will apply:

$$\sin \frac{(\Delta\theta)}{2} = \frac{1}{2d} \cdot \frac{\Delta f}{f_o}$$

which when $\Delta\theta$ is small can be written as:

$$\Delta\theta = \frac{1}{d} \cdot \frac{B}{f_o} \quad [\text{radians}]$$

$$<=>$$

$$\frac{d\theta}{df} \approx \frac{\Delta\theta}{B} = \frac{1}{d \, f_o} = \frac{1}{\frac{d}{\lambda_o} \times c_o} \quad [\text{radians/Hz}]$$

Thus, the length l on the conductor between the antenna elements is selected so that $$l \approx \frac{d\theta}{df} \times \frac{d}{\lambda_o} \times c_o$$

For the purpose of sweeping the lobe over the angular area $\theta_b - \theta_a$ (FIG. 5), digital phase shifters, for example, can be used as the frequency-independent supply network OM. It may also be found suitable to effect some form of frequency translation between the frequency-independent and the frequency-dependent networks OM and BM respectively, implying that the frequency-dependent net will then operate within the intermediate frequency range.

Figure 3:
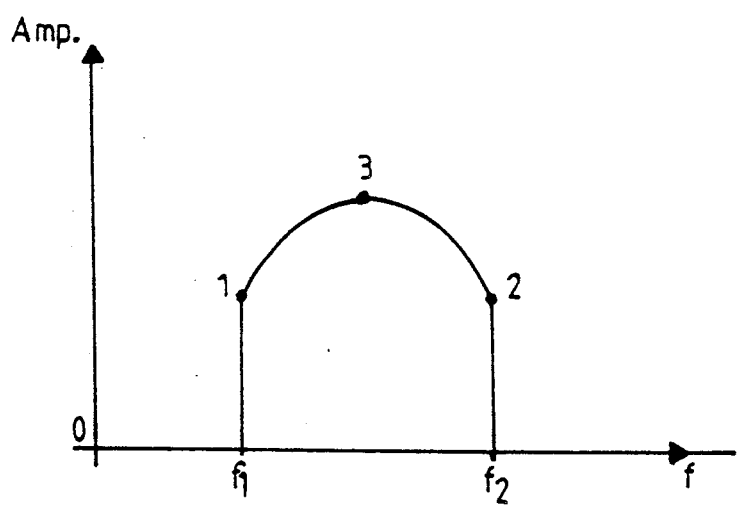

FIG. 8 illustrates how the amplitude-frequency characteristic is improved by means of the proposed method (curve a1) in comparison with the known technique (curve a2), corresponding to the curve shown in FIG. 3.

I claim:

1. A method for improving the amplitude-frequency characteristic of a radar system comprising the steps of:
   transmitting a radar pulse capable of compression upon reception and having a plurality of frequencies within a given band; and
   guiding a sweep of at least one receiving lobe over a first angular area that includes a target occupying a second angular area within said first angular area, including the substeps of:
   frequency-independently guiding said lobe over said first angular area exclusive of said second angular area; and
   forming a plurality of said lobes during said guiding over said second angular area, said lobes corresponding to said plurality of frequencies within said band and each of said lobes having an optimum position relative to said target.

2. The method of claim 1 wherein said substep of forming a plurality of said lobes further comprises the substep of:
   changing the direction of said receiving lobes over said second angular area in relation to said transmitted frequencies utilizing a frequency controlled antenna having a normal direction wherein one of said plurality of lobes is in said normal direction and has an optimum position corresponding to a centre frequency within said band and other of said plurality of lobes corresponding to frequencies higher and lower than said centre frequency obtain an optimum position to increase the effective lobe width within said second angular area.

3. The method of claim 1 wherein said step of frequency-independently guiding comprises guiding said lobe in the same plane and in the same direction as said plurality of lobes.

* * * * *